United States Patent
Liu et al.

(10) Patent No.: US 10,817,094 B2
(45) Date of Patent: Oct. 27, 2020

(54) TOUCH DISPLAY PANEL WITH REDUCED NUMBER OF CHIPS AND ELECTRONIC DEVICE INCLUDING THE SAME

(71) Applicant: Wuhan China Star Optoelectronics Semiconductor Display Technology Co., Ltd., Wuhan (CN)

(72) Inventors: Minlun Liu, Wuhan (CN); Qibing Dai, Wuhan (CN); Dan Lin, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 16/326,200

(22) PCT Filed: Nov. 7, 2018

(86) PCT No.: PCT/CN2018/114252
§ 371 (c)(1),
(2) Date: Feb. 17, 2019

(87) PCT Pub. No.: WO2019/227858
PCT Pub. Date: Dec. 5, 2019

(65) Prior Publication Data
US 2020/0142524 A1 May 7, 2020

(30) Foreign Application Priority Data
Jun. 1, 2018 (CN) .......................... 2018 1 0557913

(51) Int. Cl.
*G06F 3/041* (2006.01)
*G09G 3/3225* (2016.01)

(52) U.S. Cl.
CPC ........ *G06F 3/0412* (2013.01); *G06F 3/04166* (2019.05); *G09G 3/3225* (2013.01);
(Continued)

(58) Field of Classification Search
CPC ...... G06F 3/04166; G06F 2203/04102; G09G 3/3225
See application file for complete search history.

(56) References Cited

U.S. PATENT DOCUMENTS

| | | | |
|---|---|---|---|
| 2013/0002572 A1* | 1/2013 | Jin | .................... G02F 1/133305 345/173 |
| 2014/0055714 A1 | 2/2014 | Tsubokura et al. | |

(Continued)

FOREIGN PATENT DOCUMENTS

| | | |
|---|---|---|
| CN | 103928492 | 7/2014 |
| CN | 105489634 | 4/2016 |

(Continued)

*Primary Examiner* — Chun-Nan Lin

(57) ABSTRACT

A touch display panel and an electronic device are provided. The touch display panel comprises a display panel comprising a display area and a non-display area, a touch layer arranged on the display panel and in the display area, a functional multiplexing chip configured to drive the display panel to display and to drive the touch layer for touch sensing, a flexible printed circuit (FPC), connected to the non-display area of the display panel, and a memory chip configured to store information arranged on the FPC and electrically connected to the functional multiplexing chip.

18 Claims, 1 Drawing Sheet

(52) U.S. Cl.
CPC ............ *G06F 2203/04102* (2013.01); *G09G 2320/0673* (2013.01); *G09G 2380/02* (2013.01)

(56) References Cited

U.S. PATENT DOCUMENTS

| | | | |
|---|---|---|---|
| 2015/0160761 A1* | 6/2015 | Lee | G06F 3/041 345/174 |
| 2017/0177129 A1* | 6/2017 | Li | G06F 3/041 |
| 2019/0156737 A1* | 5/2019 | Choi | G09G 3/2092 |

FOREIGN PATENT DOCUMENTS

| | | |
|---|---|---|
| CN | 105549789 | 5/2016 |
| CN | 106406622 | 2/2017 |

* cited by examiner

TOUCH DISPLAY PANEL WITH REDUCED NUMBER OF CHIPS AND ELECTRONIC DEVICE INCLUDING THE SAME

RELATED APPLICATIONS

This application is a National Phase of PCT Patent Application No. PCT/CN2018/114252 having International filing date of Nov. 7, 2018, which claims the benefit of priority of Chinese Patent Application No. 201810557913.1 filed on Jun. 1, 2018. The contents of the above applications are all incorporated by reference as if fully set forth herein in their entirety.

FIELD AND BACKGROUND OF THE INVENTION

The present disclosure relates to the field of display technology, and more particularly, to a touch display panel and an electronic device.

With the growth and development of touch display technology, the active matrix organic light emitting diode (AMOLED) display technology is an autonomous display technology compared with a thin film transistor liquid crystal display (TFT-LCD) display. The AMOLED display technology has advantages of higher contrast, wider color gamut, faster response, being thinner and lighter, being less impacted at low temperatures, being more visible in sunlight. More particularly, the AMOLED display can display images even though it is bent, which is a powerful advantage.

A flexible display is highly competitive in the display technology in the future. One of the advantages of the flexible display technology is foldability. Owing to foldability, a larger display area is obtained without occupying more space. In the folding technique of the related art, a flexible polyimide (PI) substrate is used. The blocks of the folding technique of the related art are as follows: Firstly, a thin film transistor (TFT) and an organic light emitting diode (OLED) and the like are fabricated on the flexible PI substrate. Afterwards, a touch pattern is coated on the substrate. Finally, a laminated module formed by a polarizer and a protective glass is added onto the substrate.

Some flexibility in the external driving circuit in the related art makes flexible display better, and a flexible printed circuit (FPC) well fulfills the performance, i.e., flexibility. However, external components of the panel of the related are not flexible at present so it is necessary to reduce the number of hardware components or external hardware components to make integration better. It is also a direction for developing semiconductor circuits in the future.

Therefore, the related art has drawbacks and needs improvement urgently.

SUMMARY OF THE INVENTION

An object of the present disclosure is to propose a solution, that is, to provide a touch display panel and an electronic device. The use of the touch display panel and the electronic device shows the effect of reducing the number of chips and shortening the length of a trace between a touch layer and a functional multiplexing chip.

According to a first aspect of the present disclosure, a touch display panel comprises a display panel comprising a display area and a non-display area, a touch layer arranged on the display panel and in the display area, a functional multiplexing chip configured to drive the display panel to display and to drive the touch layer for touch sensing, a flexible printed circuit (FPC), connected to the non-display area of the display panel, and a memory chip configured to store information arranged on the FPC and electrically connected to the functional multiplexing chip. The non-display area comprises two first non-display areas and a second non-display area. The two first non-display areas are symmetrically arranged on both sides of the display area; the second non-display area is arranged at one end of the display area. The functional multiplexing chip is arranged on one side of the second non-display area adjacent to the display area. The functional multiplexing chip is connected to the touch layer through a first trace. The first trace passes the first non-display areas and the second non-display area and extending to the functional multiplexing chip. The memory chip stores voltage compensation information for compensating for an image shown on a display screen. The memory chip is configured to drive firmware information required for driving the touch layer and to drive gamma information and display data for the display panel.

According to an embodiment of the present disclosure, the functional multiplexing chip is electrically connected to the display panel through a second trace. The second trace is distributed over the second non-display area.

According to an embodiment of the present disclosure, the non-display area further comprises a third non-display area arranged in another end of the display area. The third non-display area is opposite to the second non-display area. The functional multiplexing chip is electrically connected to the display panel through the second trace and a third trace. The second trace is distributed over the second non-display area; the one end of the display panel facing the functional multiplexing chip is electrically connected to the functional multiplexing chip through the second trace. The third trace passes the third non-display area, the first non-display area, and the second non-display area sequentially. One end of the display panel away from the functional multiplexing chip is electrically connected to the functional multiplexing chip through the third trace.

According to an embodiment of the present disclosure, the touch display panel further comprises an insulating layer. The insulating layer is arranged between the display panel and the touch layer.

According to an embodiment of the present disclosure, the display panel comprises a substrate and a light emitting layer arranged in the substrate; the light emitting layer is arranged in the display area.

According to an embodiment of the present disclosure, the non-display area comprises two first non-display areas and a second non-display area. The two first non-display areas are symmetrically arranged on both sides of the display area; the second non-display area is arranged at one end of the display area. The functional multiplexing chip is arranged on one side of the second non-display area adjacent to the display area. The functional multiplexing chip is connected to the touch layer through a first trace. The first trace passes the first non-display areas and the second non-display area and extending to the functional multiplexing chip.

According to an embodiment of the present disclosure, the non-display area comprises two first non-display areas and a second non-display area. The two first non-display areas are symmetrically arranged at both sides of the display area; the second non-display area is arranged at one end of the display area. The functional multiplexing chip is arranged at one side of the second non-display area adjacent to the display area. The functional multiplexing chip is connected to the touch layer through a first trace. The first trace passes the first non-display areas and the second non-display area and extending to the functional multiplexing chip.

According to an embodiment of the present disclosure, the functional multiplexing chip is electrically connected to the display panel through a second trace. The second trace is distributed over the second non-display area.

According to an embodiment of the present disclosure, the non-display area further comprises a third non-display area arranged in another end of the display area. The third non-display area is opposite to the second non-display area. The functional multiplexing chip is electrically connected to the display panel through the second trace and a third trace. The second trace is distributed over the second non-display area; the one end of the display panel facing the functional multiplexing chip is electrically connected to the functional multiplexing chip through the second trace. The third trace passes the third non-display area, the first non-display area, and the second non-display area sequentially. One end of the display panel away from the functional multiplexing chip is electrically connected to the functional multiplexing chip through the third trace.

According to an embodiment of the present disclosure, the memory chip stores voltage compensation information for compensating for an image shown on a display screen. The memory chip is configured to drive firmware information required for driving the touch layer and to drive gamma information and display data for the display panel.

According to an embodiment of the present disclosure, the touch display panel further comprises an insulating layer. The insulating layer is arranged between the display panel and the touch layer.

According to an embodiment of the present disclosure, the display panel comprises a substrate and a light emitting layer arranged in the substrate; the light emitting layer is arranged in the display area.

According to a third aspect of the present disclosure, an electronic device comprises a housing, a main controlling circuit board arranged in the housing, and a touch display panel arranged on the housing. The touch display panel comprises a display panel comprising a display area and a non-display area, a touch layer arranged on the display panel and in the display area, a functional multiplexing chip configured to drive the display panel to display and to drive the touch layer for touch sensing, a flexible printed circuit (FPC), connected to the non-display area of the display panel, and a memory chip configured to store information arranged on the FPC and electrically connected to the functional multiplexing chip.

According to an embodiment of the present disclosure, the non-display area comprises two first non-display areas and a second non-display area. The two first non-display areas are symmetrically arranged on both sides of the display area; the second non-display area is arranged at one end of the display area. The functional multiplexing chip is arranged on one side of the second non-display area adjacent to the display area. The functional multiplexing chip is connected to the touch layer through a first trace. The first trace passes the first non-display areas and the second non-display area and extending to the functional multiplexing chip.

According to an embodiment of the present disclosure, the functional multiplexing chip is electrically connected to the display panel through a second trace. The second trace is distributed over the second non-display area.

According to an embodiment of the present disclosure, the non-display area further comprises a third non-display area arranged in another end of the display area. The third non-display area is opposite to the second non-display area. The functional multiplexing chip is electrically connected to the display panel through the second trace and a third trace. The second trace is distributed over the second non-display area; the one end of the display panel facing the functional multiplexing chip is electrically connected to the functional multiplexing chip through the second trace. The third trace passes the third non-display area, the first non-display area, and the second non-display area sequentially. One end of the display panel away from the functional multiplexing chip is electrically connected to the functional multiplexing chip through the third trace.

According to an embodiment of the present disclosure, the memory chip stores voltage compensation information for compensating for an image shown on a display screen. The memory chip is configured to drive firmware information required for driving the touch layer and to drive gamma information and display data for the display panel.

According to an embodiment of the present disclosure, the touch display panel further comprises an insulating layer. The insulating layer is arranged between the display panel and the touch layer.

According to an embodiment of the present disclosure, the display panel comprises a substrate and a light emitting layer arranged in the substrate; the light emitting layer is arranged in the display area.

The touch chip and the display chip provided by the present disclosure are integrated in one functional multiplexing chip. So the display and the function of the touch are perfectly integrated, and the manufacturing cost of a driving integrated circuit (IC) is reduced. Furthermore, the length of the trace between the touch layer and the functional multiplexing chip is shortened.

BRIEF DESCRIPTION OF THE SEVERAL VIEWS OF THE DRAWINGS

In order to more clearly illustrate the embodiments of the present disclosure or related art, the following figures will be described in the embodiments are briefly introduced. It is obvious that the drawings are merely some embodiments of the present disclosure, those of ordinary skill in this field can obtain other figures according to these figures without paying the premise.

DESCRIPTION OF SPECIFIC EMBODIMENTS OF THE INVENTION

Figure 1:
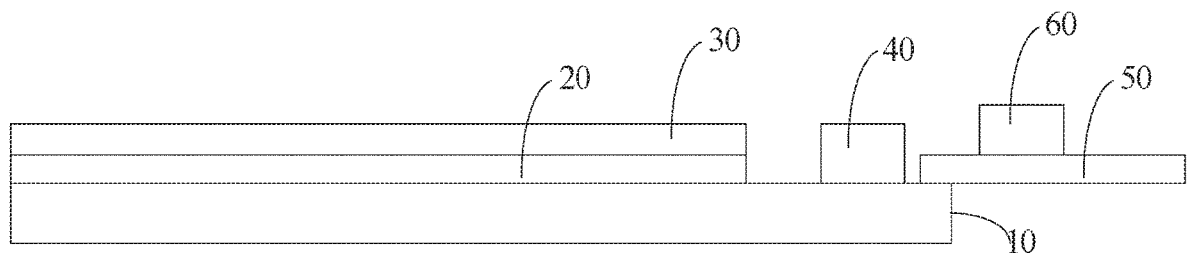
FIG. 1 is a schematic diagram of a touch display panel according to a first embodiment of the present disclosure.

For the purpose of description rather than limitation, the following provides such specific details as a specific system structure, interface, and technology for a thorough understanding of the application. However, it is understandable by persons skilled in the art that the application can also be implemented in other embodiments not providing such specific details. In other cases, details of a well-known apparatus, circuit and method are omitted to avoid hindering the description of the application by unnecessary details.

In the disclosure, it is should be understood that spatially relative terms, such as "center", "longitudinal", "lateral", "length", "width", "above", "below", "front", "back", "left", "right", "horizontal", "vertical", "top", "bottom", "inner", "outer", "clockwise", "counterclockwise", "axial", "radial", "circumferential", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. The spatially relative terms are not limited to specific orientations depicted in the figures. In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

All of the terminologies containing one or more technical or scientific terminologies have the same meanings that persons skilled in the art understand ordinarily unless they are not defined otherwise. For example, "arrange," "couple," and "connect," should be understood generally in the embodiments of the present disclosure. For example, "firmly connect," "detachably connect," and "integrally connect" are all possible. It is also possible that "mechanically connect," "electrically connect," and "mutually communicate" are used. It is also possible that "directly couple," "indirectly couple via a medium," and "two components mutually interact" are used.

In the description of this specification, the description of the terms "one embodiment", "some embodiments", "examples", "specific examples", or "some examples", and the like, means to refer to the specific feature, structure, material or characteristic described in connection with the embodiments or examples being included in at least one embodiment or example of the present disclosure. In the present specification, the term of the above schematic representation is not necessary for the same embodiment or example. Furthermore, the specific feature, structure, material, or characteristic described may be in combination in a suitable manner in any one or more of the embodiments or examples. In addition, it will be apparent to those skilled in the art that different embodiments or examples described in this specification, as well as features of different embodiments or examples, may be combined without contradictory circumstances.

In the present disclosure, unless definite regulation and limitation, a first feature "above" or "under" a second feature may include direct contact of the first and second features. A first feature "above" or "under" a second feature may also include first feature contacting the second feature via other features between the first and second features rather than contact directly. Moreover, the first feature "above," "over," or "on" the second feature means that the first feature is over or above the second feature or that the level of the first feature is merely higher than the level of the second feature. The first feature "below," "under," or "beneath" the second feature means that the first feature is under or below the second feature or that the level of the first feature is merely lower than the level of the second feature.

Figure 2:
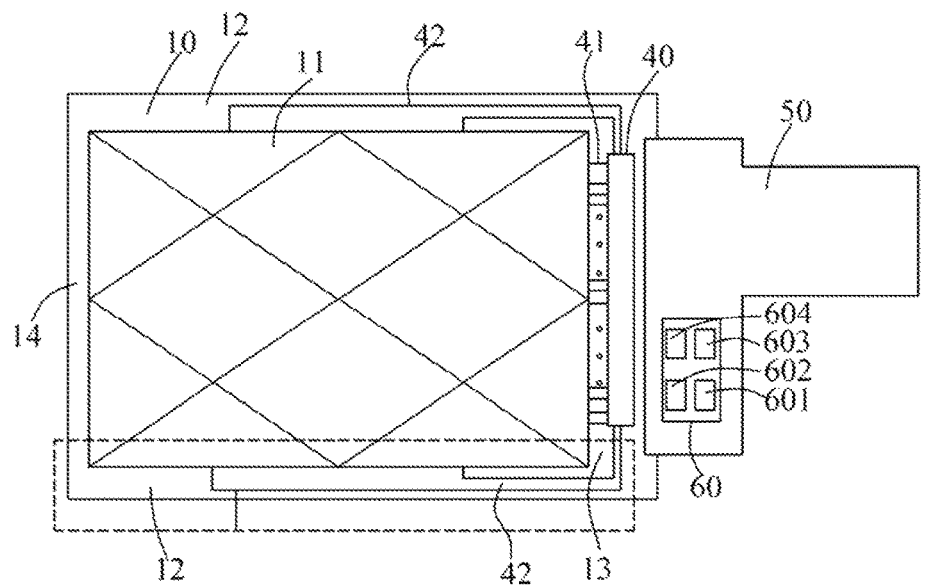
FIG. 2 is a schematic diagram of a touch display panel according to a second embodiment of the present disclosure.

Please refer to FIG. 1 and FIG. 2. FIG. 1 is a schematic diagram of a touch display panel according to a first embodiment of the present disclosure. The touch display panel includes a display panel 10, an insulating layer 20, a touch layer 30, a functional multiplexing chip 40, a flexible printed circuit (FPC) 50, and a memory chip 60.

The display panel 10 includes a display area 11 and a non-display area. The touch layer 30 is arranged on the display panel 10 and in the display area 11. The functional multiplexing chip 40 is arranged on the display panel 10 and in the non-display area. The FPC 50 is connected to the non-display area of the display panel 10. The memory chip 60 is arranged on the FPC 50 and configured to store information. The memory chip 60 is electrically connected to the functional multiplexing chip 40.

The display panel 10 is an OLED display panel. The display panel 10 includes a substrate, a TFT device layer, a source/drain metallic layer, an anode metallic layer, a light emitting layer, and a cathode metallic layer. The TFT device layer, the source/drain metallic layer, the anode metallic layer, the light emitting layer, and the cathode metallic layer are arranged on the substrate. The light emitting layer is arranged in the display area 11 of the display panel 10.

The display area 11 of the display panel 10 is substantially rectangular or rounded rectangular. The non-display area includes two first non-display areas 12, a second non-display area 13, and a third non-display area 14. The first non-display areas 12 are symmetrically arranged on both sides of the display area 11. The second non-display area 13 is arranged at one end of the display area 11. The third non-display area 14 is arranged at the other end of the display area 11.

The insulating layer 20 is made of an insulating material. Besides, the insulating layer 20 may be a glass substrate or a thin film encapsulation layer.

The touch layer 30 may be a plurality of touch electrodes arranged on the insulating layer 20. The touch layer 30 may be self-capacitive or mutually capacitive.

In some embodiments, an optical film layer and a protective film layer are further arranged on a touch layer 30. The optical film layer may include a polarizer and a brightness enhancement film.

The functional multiplexing chip 40 is configured to drive the display panel 10 for display and to drive the touch layer 30 for touch sensing. The functional multiplexing chip 40 is arranged on one side of the second non-display area 13 adjacent to the display area 11.

The functional multiplexing chip 40 is electrically connected to the touch layer 30 through a first trace 42. The first trace 42 passes the first non-display area 12 and the second non-display area 13 sequentially. The first trace 42 is distributed over each of the first non-display areas 12.

The functional multiplexing chip 40 is electrically connected to the display panel 10 through a second trace 41. The second trace 41 is distributed over the second non-display area 13.

In another embodiment, a functional multiplexing chip 40 is further electrically connected to a display panel 10 through a third trace. The third trace is connected to one end of the display panel 10 away from the functional multiplexing chip 40. The third trace passes a third non-display area 14, a first non-display area 12, and a second non-display area 13 sequentially. Besides, one end of the display panel 10 away from the functional multiplexing chip 40 is electrically connected to the functional multiplexing chip 40 through the third trace.

The memory chip 60 stores voltage compensation information 601 for compensating for images shown on a display screen. The memory chip 60 is configured to drive firmware information 602 required for driving the touch layer and to drive gamma information 603 and display data 604 for the display panel. The voltage compensation information 601 is obtained by compensating for external charge-coupled device (CCD) photographing and calculation on the display screen. The data extracted by the functional multiplexing chip 40 is transformed into an optimized panel driving voltage, thereby achieving an optimal display effect.

The present disclosure further provides an electronic device including a housing, a main controlling circuit board, and a touch display panel. The main controlling circuit board is arranged in the housing. The touch display panel is arranged on the housing. The touch display panel is exactly the touch display panel introduced in the above-mentioned embodiment. A flexible printed circuit (FPC) 50 on the touch display panel is electrically connected to the main controlling board by bending.

In the touch display panel and the electronic device of the present disclosure, the touch chip and the display chip are integrated into one functional multiplexing chip so that the display and the function of touch are perfectly integrated. The manufacturing cost of a driving integrated circuit (IC) is obviously reduced as well. This method of integrating an external driving IC reduces the number of ICs used, so that the space occupied by the IC on the flexible circuit board can be saved. It is also possible to reduce the area of the FPC and reduce the manufacturing cost of the FPC. A touch driving IC is closer to the driving circuit to avoid signal loss caused by the long driving circuit.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A touch display panel, comprising:
   a display panel, comprising a display area and a non-display area;
   a touch layer, arranged on the display panel and in the display area;
   a functional multiplexing chip, configured to drive the display panel to display and to drive the touch layer for touch sensing;
   a flexible printed circuit (FPC), connected to the non-display area of the display panel; and
   a memory chip, configured to store information arranged on the FPC and electrically connected to the functional multiplexing chip,
   wherein the non-display area comprises two first non-display areas and a second non-display area, the two first non-display areas are symmetrically arranged on both sides of the display area, the second non-display area is arranged at one end of the display area;
   the functional multiplexing chip is arranged on one side of the second non-display area adjacent to the display area, the functional multiplexing chip is connected to the touch layer through a first trace, the first trace passes the first non-display areas and the second non-display area and extends to the functional multiplexing chip;
   wherein the memory chip stores voltage compensation information for compensating for an image shown on a display screen, the memory chip is configured to drive firmware information required for driving the touch layer and to drive gamma information and display data for the display panel.

2. The touch display panel of claim 1, wherein functional multiplexing chip is electrically connected to the display panel through a second trace, the second trace is distributed over the second non-display area.

3. The touch display panel of claim 1, wherein the non-display area further comprises a third non-display area arranged at another end of the display area the third non-display area is opposite to the second non-display area;
   the functional multiplexing chip is electrically connected to the display panel through the second trace and a third trace;
   the second trace is distributed over the second non-display area, the one end of the display panel facing the functional multiplexing chip is electrically connected to the functional multiplexing chip through the second trace;
   the third trace passes the third non-display area, the first non-display area, and the second non-display area sequentially, one end of the display panel away from the functional multiplexing chip is electrically connected to the functional multiplexing chip through the third trace.

4. The touch display panel of claim 1, wherein the touch display panel further comprises an insulating layer, the insulating layer is arranged between the display panel and the touch layer.

5. The touch display panel of claim 1, wherein the display panel comprises a substrate and a light emitting layer arranged in on the substrate, the light emitting layer is arranged in the display area.

6. A touch display panel, comprising:
   a display panel, comprising a display area and a non-display area;
   a touch layer, arranged on the display panel and in the display area;
   a functional multiplexing chip, configured to drive the display panel to display and to drive the touch layer for touch sensing;
   a flexible printed circuit (FPC), connected to the non-display area of the display panel, and
   a memory chip, configured to store information arranged on the FPC and electrically connected to the functional multiplexing chip;
   wherein the non-display area comprises two first non-display areas and a second non-display area, the two first non-display areas are symmetrically arranged on both sides of the display area, the second non-display area is arranged at one end of the display area;
   wherein the non-display area further comprises a third non-display area arranged at another end of the display area, the third non-display area is opposite to the second non-display area, a third trace passes the third non-display area, the first non-display area, and the second non-display area sequentially, one end of the display panel away from the functional multiplexing chip is electrically connected to the functional multiplexing chip through the third trace.

7. The touch display panel of claim 6, wherein
   the functional multiplexing chip is arranged on one side of the second non-display area adjacent to the display area, the functional multiplexing chip is connected to the touch layer through a first trace, the first trace passes the first non-display areas and the second non-display area and extends to the functional multiplexing chip.

8. The touch display panel of claim 7, wherein the functional multiplexing chip is electrically connected to the display panel through a second trace, the second trace is distributed over the second non-display area.

9. The touch display panel of claim 7, wherein
the functional multiplexing chip is electrically connected to the display panel through the second trace and the third trace;
the second trace is distributed over the second non-display area, the one end of the display panel facing the functional multiplexing chip is electrically connected to the functional multiplexing chip through the second trace.

10. The touch display panel of claim 6, wherein the memory chip stores voltage compensation information for compensating for an image shown on a display screen, the memory chip is configured to drive firmware information required for driving the touch layer and to drive gamma information and display data for the display panel.

11. The touch display panel of claim 6, wherein the touch display panel further comprises an insulating layer, the insulating layer is arranged between the display panel and the touch layer.

12. The touch display panel of claim 6, wherein the display panel comprises a substrate and a light emitting layer arranged on the substrate, the light emitting layer is arranged in the display area.

13. An electronic device, comprising:
a housing;
a main controlling circuit board, arranged in the housing; and
a touch display panel, arranged on the housing, the touch display panel comprising:
   a display panel, comprising a display area and a non-display area;
   a touch layer, arranged on the display panel and in the display area;
   a functional multiplexing chip, configured to drive the display panel to display and to drive the touch layer for touch sensing;
   a flexible printed circuit (FPC), connected to the non-display area of the display panel; and
   a memory chip, configured to store information arranged on the FPC and electrically connected to the functional multiplexing chip;
wherein the non-display area comprises two first non-display areas and a second non-display area, the two first non-display areas are symmetrically arranged on both sides of the display area, the second non-display area is arranged at one end of the display area, the functional multiplexing chip is arranged on one side of the second non-display area adjacent to the display area, the functional multiplexing chip is connected to the touch layer through a first trace, the first trace passes the first non-display areas and the second non-display area and extends to the functional multiplexing chip.

14. The electronic device of claim 13, wherein the functional multiplexing chip is electrically connected to the display panel through a second trace, the second trace is distributed over the second non-display area.

15. The electronic device of claim 13, wherein the non-display area further comprises a third non-display area arranged at another end of the display area, the third non-display area is opposite to the second non-display area;
the functional multiplexing chip is electrically connected to the display panel through the second trace and a third trace;
the second trace is distributed over the second non-display area the one end of the display panel facing the functional multiplexing chip is electrically connected to the functional multiplexing chip through the second trace;
the third trace passes the third non-display area, the first non-display area, and the second non-display area sequentially one end of the display panel away from the functional multiplexing chip is electrically connected to the functional multiplexing chip through the third trace.

16. The electronic device of claim 13, wherein the memory chip stores voltage compensation information for compensating for an image shown on a display screen, the memory chip is configured to drive firmware information required for driving the touch layer and to drive gamma information and display data for the display panel.

17. The electronic device of claim 13, wherein the touch display panel further comprises an insulating layer the insulating layer is arranged between the display panel and the touch layer.

18. The electronic device of claim 13, wherein the display panel comprises a substrate and a light emitting layer arranged on the substrate, the light emitting layer is arranged in the display area.

* * * * *